(12) United States Patent
Matsumoto et al.

(10) Patent No.: US 7,912,008 B2
(45) Date of Patent: Mar. 22, 2011

(54) HOME AGENT, MOBILE ROUTER, AND MOBILE COMMUNICATION METHOD USING THE SAME

(75) Inventors: Taisuke Matsumoto, Yokohama (JP); Hirokazu Kobayashi, Inagi (JP); Makoto Funabiki, Yokohama (JP); Masayuki Kumazawa, Yokohama (JP)

(73) Assignee: Panasonic Corporation, Osaka (JP)

( * ) Notice: Subject to any disclaimer, the term of this patent is extended or adjusted under 35 U.S.C. 154(b) by 763 days.

(21) Appl. No.: 10/546,302

(22) PCT Filed: Jul. 14, 2004

(86) PCT No.: PCT/JP2004/010354
§ 371 (c)(1),
(2), (4) Date: Aug. 19, 2005

(87) PCT Pub. No.: WO2005/006676
PCT Pub. Date: Jan. 20, 2005

(65) Prior Publication Data
US 2006/0171370 A1 Aug. 3, 2006

(30) Foreign Application Priority Data

Jul. 15, 2003 (JP) .................................. 2003-274699
Jul. 6, 2004 (JP) .................................. 2004-199173

(51) Int. Cl.
*H04W 4/00* (2009.01)
*G06F 15/173* (2006.01)
*H04L 12/28* (2006.01)
*H04L 12/56* (2006.01)

(52) U.S. Cl. .................. 370/331; 370/338; 709/242

(58) Field of Classification Search .................. 370/331
See application file for complete search history.

(56) References Cited

U.S. PATENT DOCUMENTS

| 7,143,173 B2 * | 11/2006 | Wojtkiewicz ................. 709/228 |
| 7,286,520 B2 * | 10/2007 | Takeda et al. ................. 370/332 |
| 7,328,281 B2 * | 2/2008 | Takeda et al. ................. 709/246 |

(Continued)

FOREIGN PATENT DOCUMENTS

JP 09-172451 6/1997

(Continued)

OTHER PUBLICATIONS

Devarapalli, et al., Nemo Basic Support, Jun. 21, 2003, Internet Engineering Task Force, pp. 5-9, 17-18, 30-34 and 40-44.*

(Continued)

*Primary Examiner* — Daniel J Ryman
*Assistant Examiner* — Christopher Crutchfield
(74) *Attorney, Agent, or Firm* — RatnerPrestia

(57) ABSTRACT

A mobile communication method includes: a step for transmitting a binding update message for notification of a care-of-address of the network where the mobile network has gone, from a mobile router to a home agent, which can be used after the network has moved; and a step performed upon reception of the binding update message, for notification by the home agent of routing information concerning the route to the mobile network managed by the mobile router to the home network. Thus, the routing information from a mobile node is given to a gateway and the router on the home network without delay after movement, and it is possible to prevent loss of data sent to the mobile node belonging to the network to which the mobile network is connected after the movement.

15 Claims, 14 Drawing Sheets

U.S. PATENT DOCUMENTS

| | | | |
|---|---|---|---|
| 7,423,995 B1* | 9/2008 | Elliott et al. | 370/332 |
| 2002/0006133 A1* | 1/2002 | Kakemizu et al. | 370/401 |
| 2002/0059433 A1* | 5/2002 | Oh | 709/227 |
| 2002/0059452 A1* | 5/2002 | Yokota et al. | 709/238 |
| 2002/0131602 A1* | 9/2002 | Ishii | 380/278 |
| 2003/0026241 A1* | 2/2003 | Ono et al. | 370/349 |
| 2004/0224681 A1* | 11/2004 | Sjostrand | 455/433 |

FOREIGN PATENT DOCUMENTS

| | | |
|---|---|---|
| JP | 2002-319966 | 10/2002 |
| JP | 2002-359633 | 12/2002 |

OTHER PUBLICATIONS

Kniveton, et al., Mobile Router Tunneling Protocol, Nov. 1, 2002, Internet Engineering Task Force, pp. 5-8.*

Narten, et al., Neighbor Deiscovery for IP Verion 6 (RFC 2461), Internet Engineering Task Force, pp. 44-48 and 64-66.*

Johnson et al., Mobility Support in IPv6, May 26, 2003, Internet Engineering Taks Force, 22nd Revision, pp. 40-44.*

Devarapalli, Nemo Basic Support, Jun. 21, 2003, Internet Engineering Task Force, pp. 5-9, 17-18, 30-34 and 40-44.*

Kniveton, Mobile Router Tunneling Protocol, Nov. 1, 2002, Internet Engineering Task Force.*

Johnson, Mobility Support in IPv6, May 26, 2003, Internet Engineering Taks Force, 22nd Revision.*

Vijay Devarapalli, Ryuiji Wakikawa, Alexandru Petrescu and Pascal Thubert, Nemo Basic Support, Jun. 21, 2003, Internet Engineering Task Force, pp. 5-9, 17-18, 30-34 and 40-44.*

R. Coltun, D. Ferguson and J. Moy, Request for Comments 2740: OSPF for IPv6, pp. 1-80.*

Eric Nordmark, Securing MIPv6 Bus Using Return Routability, Internet-Draft, Nov. 12, 2001, pp. 1-42.*

Narten, et al., Neighbor Deiscovery for IP Verion 6 (RFC 2461), Internet Engineering Task Force, pp. 44-48 and 64-66, Dec. 1998.*

R. Coltun, D. Ferguson and J. Moy, Request for Comments 2740: OSPF for IPv6, pp. 1-80, Dec. 1999.*

International Search Report for application No. PCT/JP2004/010354 dated Aug. 31, 2004.

T.J. Kniveton, et al., "Mobile Router Tunneling Protocol," draft-kniveton-mobrtr-03. txt, Nov. 1, 2002.

A. Petrescu, et al., "Issues in Designing Mobile IPv6 Network Mobility with the MR-HA Bidirectional Tunnel (MRHA)," draft-petrescu-nemo-mrha-02. txt, Mar. 2003.

* cited by examiner

FIG.2A

| HOME ADDRESS /201 | CARE OF ADDRESS /202 | PREFIX /203 |
|---|---|---|
| HoA1 | CoA1 | M-Prefix |

FIG.2B

| DESTINATION /204 | NEXT HOP /205 | INTERFACE /206 |
|---|---|---|
| M-Prefix | LL-MR1 | if1 |

FIG.2C

| DESTINATION | NEXT HOP /207 | INTERFACE /208 |
|---|---|---|
| M-Prefix | CoA1 | tn1 |

FIG.3A

| DESTINATION | NEXT HOP | INTERFACE |
|---|---|---|
| M-Prefix | LL-MR1 | if2 |

| DESTINATION | NEXT HOP | INTERFACE |
|---|---|---|
| M-Prefix | LL-HA | if2 |

| HOME DDRESS | CARE OF ADDRESS | PREFIX |
|---|---|---|
| HoA1 | CoA1 | M-Prefix |
| HoA2 | CoA2 | M-Prefix |

FIG.13B

| DESTINATION | NEXT HOP | INTERFACE | DEFAULT ROUTE |
|---|---|---|---|
| M-Prefix | CoA1 | tn1 | 1 |
| M-Prefix | CoA2 | tn2 |  |

| DESTINATION | NEXT HOP | INTERFACE | DEFAULT ROUTE |
|---|---|---|---|
| M-Prefix | CoA1 | tn1 |  |
| M-Prefix | CoA2 | tn2 | 1 |

| DESTINATION | NEXT HOP | INTERFACE | PRIORITY |
|---|---|---|---|
| M-Prefix | CoA1 | tn1 | 200 |
| M-Prefix | CoA2 | tn2 | 150 |

212

HOME AGENT, MOBILE ROUTER, AND MOBILE COMMUNICATION METHOD USING THE SAME

This Application is a U.S. National Phase Application of PCT International Application PCT/JP2004/010354.

TECHNICAL FIELD

The present invention relates to a mobile communication method between a local network which is moving and other mobile communication networks, in a mobile communication system for access to the Internet.

BACKGROUND ART

Mobile IP is one of the management methods for mobile Internet systems. Mobile IPv4 corresponding to IPv4 (Internet Protocol Version4) is standardized under RFC3220 (IP Mobility Support). Meanwhile, mobile IPv6 corresponding to IPv6 (Internet Protocol Version6) is now in the process of standardization, Internet draft "draft-ietf-mobileip-ipv6 (Mobility Support in IPv6)" having been created. By those protocols, when a terminal transfers between different networks, the transferring terminal can communicate using the same address.

Furthermore, it has been proposed that, by extending the mobile IP protocol, even where one local network transfers as a unit between different networks, the node belonging to the mobile network is allowed to use the same address for communication. Standardization of the technology for realizing this scheme, known as NEMO, is now proceeding in Internet draft "draft-ietf-nemo-basic-support (Nemo Basic Support Protocol)".

Specifically, when the mobile network which the mobile router supported by NEMO manages moves away from its home network into a connection with an external network, the mobile router acquires the prefix information of the network to which it is connected currently from among the network information sent from the access router of the network to which the mobile router was connected, to thereby produce a care-of-address to contact the mobile network. Thereafter, the mobile router transmits a binding update message to the home agent. The home agent, after receiving the binding update message from the mobile router, prepares or updates a binding cache entry for associating the home address of the mobile router with a care-of-address.

Then, when a packet from a communication terminal of an external network addressed to a node belonging to the mobile network arrives at the gateway connecting the external network and the home network, the gateway designates the mobile router which has moved away as the next hop router for the node belonging to the mobile network, and relays the packet to the home network. The packet relayed is received by the home agent acting as a proxy, and the home agent encapsulates the packet and transfers it to the care-of-address of the mobile router. The mobile router decapsulates the packet relayed by the home agent and takes out the packet addressed to the node belonging to the mobile network and relayed by the gateway. Then, the mobile router forwards the extracted packet to the mobile network controlled by the mobile router. Due to this, the node belonging to the mobile network can receive the packet.

However, if the gateway fails to receive the routing protocol from the mobile router due to the departure of the mobile network together with its mobile router from the home network and consequently routing table information for relaying a packet to the mobile network is deleted from the gateway, packet transfer from the gateway to the mobile router becomes impossible. This results in the disappearance of a packet addressed to a node of the network which moved.

Methods for preventing such disappearance of packets are given in Document 1 (Mobile Router Tunneling Protocol "draft-kniveton-mobrtr-03.txt") and Document 2 (Issues in Designing Mobile IPv6 Network Mobility with the MR-HA Bi-directional Tunnel (MRHA) "draft-petrescu-nemo-mrha-02.txt". In those conventional methods, the home agent receives a binding update and transmits the binding acknowledgement message response to the mobile router. The home agent then receives a routing protocol sent from the mobile router via a tunnel. Thereafter, the routing information received by means of the routing protocol is given to the gateway at the home network.

Document 1 describes a method in which the mobile router gives route information concerning a mobile network under its control to the home agent by use of a dynamic routing protocol. This allows the home agent to act as a router having a path to the mobile network by way of the mobile router. Meanwhile, the home agent updates the routing table depending upon the route information of from the moved mobile router. Furthermore, the home agent notifies the home network of the route information based on an updated routing table whereby the gateway which has been notified transmits to the home agent the packet addressed to the mobile network.

Document 2 describes a method in which the home agent transparently relays from the mobile router to the gateway information on the route to the mobile network, without the use of a dynamic routing protocol. Due to this, the mobile router and the mobile network under its control are detected from the gateway as if they existed in the home network. Meanwhile, the home agent does not update the routing table. Instead, it captures a packet in which the mobile router is designated as the next hop to the node belonging to the mobile network and transmits it to the node belonging to the mobile network by way of a tunnel.

However, in the conventional mobile communication method described in Document 1, a delay possibly occurs in the delivery of routing information from the home agent to the gateway after the home agent receives a binding update message, during which there is a fear of losing the packet addressed to the node of the mobile network. Further, because reliability is low on the communication route from the mobile network to the home agent and an arrival-confirmation message is not in the routing protocol, the routing information from the disengaged mobile router is not assured of arrival at the home agent. Due to this, in the event the routing information from the initial mobile router is not conveyed to the home agent, the information on the route to the mobile network at the gateway is not updated until the next routing protocol is transmitted (usually 30 seconds), and the packets addressed to the node of the mobile network are lost.

Furthermore, in the conventional mobile communication method described in Document 2, in the gateway, the packet address (next hop) to the mobile network is always the address of the mobile network when it was connected to the home network, and also the possibility of losing routing information on the low-reliable communication route due to the routing protocol, so that the home agent is required to capture the packet forwarded from the gateway. This causes high overhead.

DISCLOSURE OF THE INVENTION

It is an object of the present invention to provide a mobile communication method that, when a mobile network moves between other mobile communication networks, mobile router address is immediately changed so that a message to a node on the mobile network is not lost.

A mobile communication method of the invention comprises: a step in which the mobile router managing a mobile local network which moves together as one unit between other networks notifies the home agent of the care-of address which that mobile router has acquired at the new location of the mobile network; a step of giving to the home network routing information concerning the mobile network which the mobile router manages when the home agent receives the binding update message; and a step that a node on the home network receives the routing information and effects route control based upon the routing information. Due to this, because the information on the route to the mobile network is given, without a delay, to the gateway and router on the home network after the movement of the mobile network, it is possible to prevent loss of data addressed to a node of the moved network.

Meanwhile, a mobile communication method of the invention further comprises a step where the home agent sends confirmation to the mobile router that notification of the routing information has been made, and a step where if the mobile router has not received information from the home agent, the mobile router gives the home agent route control information concerning the mobile network according to the routing protocol. Due to this, even where the home agent does not have a function to give the routing information to the home network when a binding update message is received, the mobile router sends the routing protocol via a tunnel, thus making it possible to give the routing information to the home network.

The routing information in the mobile communication method of the invention has instructions to transfer data addressed to the mobile network to the home agent. Due to this, the necessity for the home agent to capture the data addressed to the mobile network and flowing to the home network is eliminated. Thus, overhead can be suppressed.

A home agent of the invention comprises: a tunnel establishing section for forming a tunnel to receive a care-of address acquired at the network where the mobile network has gone and sent from a mobile router managing a mobile network moving as one local network between other networks, and to transmit data to the mobile network; a route information generating section for generating routing information to be given to the home network concerning the mobile network the mobile router manages, this information put in a binding update message sent from the mobile router; a route information transmitting section for giving the routing information to the home network; a route-response generating section for generating a response indicating that information from the route information transmitting section has been sent; and a response section for transmitting the response indicating that notification has been made to the mobile router. Due to this, the home agent can receive the data addressed to the moved mobile router, so proper transfer of the tunnel route is possible. Furthermore, the home agent is enabled to correctly inform the mobile router of the fact that routing information which had been received has been given to the home network.

Further, the routing information transmitted by the home agent of the invention to the home network contains instructions to transfer data addressed to the mobile network to the home agent. Due to this, when the gateway and router on the home network receive data addressed to a node belonging to a network that has moved away, they transfer it not to a mobile network prefix but to the home agent. The home agent is thus enabled to transmit the data correctly to a node belonging to the mobile network.

Meanwhile, the route information generating section in the home agent of the invention generates information of the route to the mobile network and instructs the route information transmitting section to transmit same, according to a request from the mobile router. Due to this, the home agent satisfactorily gives the information of the route to the mobile network, following a request from the mobile router.

A mobile router of the invention comprises: a movement detecting section for deciding whether or not there is a change in the network to which it is connected; a movement notifying section for transmitting a binding update message notifying a home agent of the care-of-address acquired at the network where the router has gone when the movement detecting section detects a change in the network to which it is connected; and a route information control request section for requesting the home agent to give the home network information on the route to the mobile network the mobile router manages. Due to this, when the mobile router moves and changes the network to which it is connected, it gives its new address to the home agent. Further, by using a binding update message, the home agent can be requested to transmit routing information to the home network. Due to this, when there is no response to the binding update message, re-request is possible by again sending a binding update message. This makes it possible to convey a request to the home agent without fail. Furthermore, notification of the home network also is possible.

Meanwhile, a mobile router of the invention sends routing information to a home network at a predetermined time interval only when connected to the home network. It is thus possible to correctly control the data delivery route while the mobile router is connected to the home network.

Meanwhile, the route information transmitting section of the mobile router of the invention has a function of giving to the home agent information of the route to the mobile network by means of a routing protocol when the mobile router receives a response that requests from the home agent cannot be carried out. Due to this, the mobile router is enabled to detect the case where the home agent does not have the capability to receive a binding update message and to give routing information to the home network. Hence, the mobile router can send information to the home agent by means of a routing protocol. Routing information can be notified also to the home network.

Meanwhile, the route information transmitting section of the mobile router of the invention has a function to examine whether or not the binding acknowledge message from the home agent contains information indicating that a route information transmission request has been made by the home agent. Due to this, the mobile router is enabled to detect that the home agent received a binding update message but did not actually send a route information to the home network. Hence, the mobile router can send information to the home agent by means of a routing protocol, and routing information can also be given to the home network.

As described above, according to the present invention, when a mobile network moves between other mobile communication networks, the node on a home network immediately changes the routing table to the mobile network, thereby preventing the loss of a message to the mobile network.

BRIEF DESCRIPTION OF THE DRAWINGS

FIG. 2A is a diagram showing a binding-cache data structure of a home agent in embodiment 1 of the invention.

FIGS. 2B and 2C are figures showing a data structure of a routing table of the home agent in the embodiment of the invention.

FIGS. 3A and 3B are figures showing a data structure of a routing table of a gateway in embodiment 1 of the invention.

FIG. 13A is a figure showing a data structure of a binding cache in embodiment 2 of the invention.

FIGS. 13B, 13C and 13D are figures showing a data structure of a routing table in embodiment 2 of the invention.

BEST MODE FOR CARRYING OUT THE INVENTION

The present invention will be explained in detail below along with the drawings.

Embodiment 1

Figure 1:
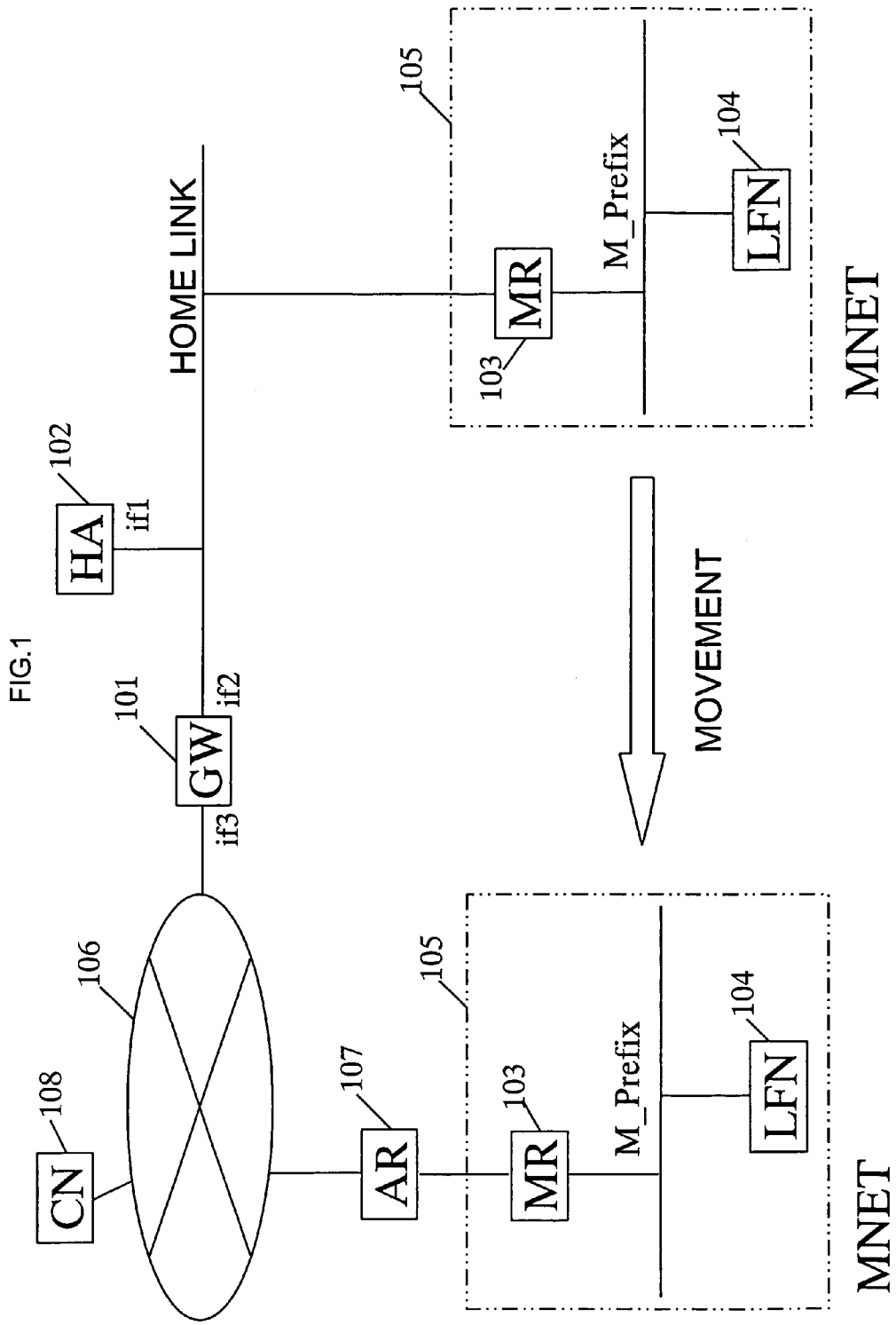
FIG. 1 is an arrangement diagram of a mobile communication system in embodiment 1 of the present invention.

FIG. 1 is an arrangement diagram of a mobile communication system in an embodiment of the present invention.

In FIG. 1, GW (gateway) 101 is a device for connecting a home network with an external network (the Internet). HA (home agent) 102 is a device for managing the movement of a mobile network, and for ensuring a packet transmission to the mobile network when it is moving. MR (mobile router) 103 is a router containing a plurality of LFNs (local fixed nodes) 104, which can be used after the network is moved, and supports the routing protocol (RIP for example). The LFN (local fixed node) 104 is a terminal fixed to MR 103. It is not requisite to provide the terminal itself with a mobility support function. MNET (mobile network) 105 is a network constituted by MR 103 and LFN 104 that can be used after being moved. The Internet 106 is an electric communication circuit including wireless elements. AR (access router) 107 is a router that allows the MNET 105 to have access to the Internet 106 at the new location to which MNET 105 has moved. CN (node with which to have communication) 108 is a communication terminal connected to the external network.

The mobile communication system configured as above is explained below in its operation and function.

Figure 8:
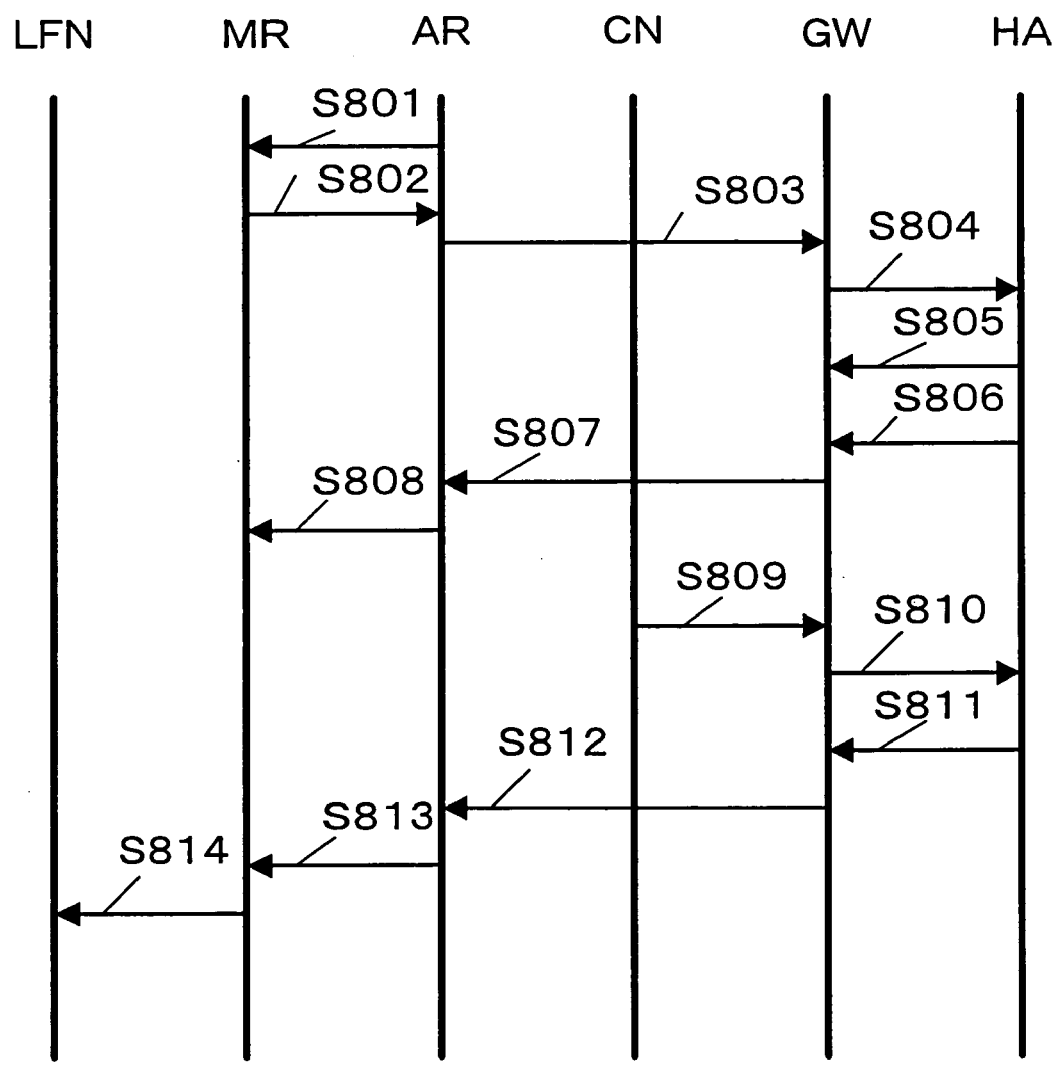
FIG. 8 is a sequence chart showing a mobile communication method in embodiment 1 of the invention.

FIG. 8 is a sequence chart showing an operation of data transfer when MR 103 is moved.

At first, MNET 105 moves from a home network to an external network, thereby connecting MR 103 with AR 107. MR 103 receives a router advertisement from AR 107 (step S801) and produces a care of address.

Then, MR 103 transmits a binding update message addressed to HA 102 to AR 107 (step S802). The message is delivered from AR 107 to HA 102 (step S804) through GW 101 (step S803).

Then, HA 102, after receiving the binding update message, generates an entry for the home address in its own binding cache.

FIG. 2A shows a data structure of the binding cache of HA 107 in this embodiment. In Home Address 201 is registered mobile-node home address HoA1. In Care of address 202 is registered a care-of-address CoA1 acquired from the network to which the mobile network has gone. In Prefix 203 is registered a prefix "M-prefix" of the network MR 103 manages.

Figure 9A:
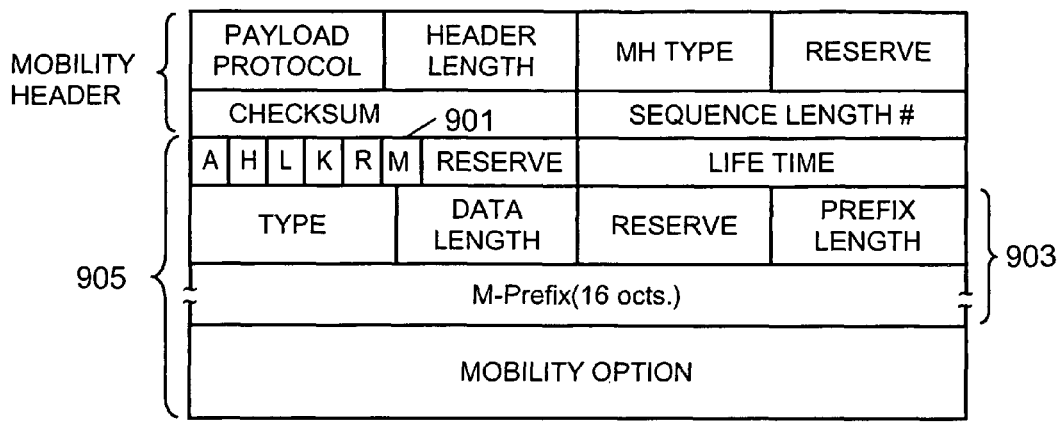
FIG. 9A is a figure showing a data structure of a binding update message in embodiment 1 of the invention.

FIG. 9A shows a data structure of the binding update message. In FIG. 9A, M flag 901 is a flag requesting HA 102 to forward information on the route to MR 103 to the home network. Further, mobile prefix option 903 stores the prefix (M-Prefix) of the network under management of MR 103, given to HA 102 in a binding update message.

Figure 10:
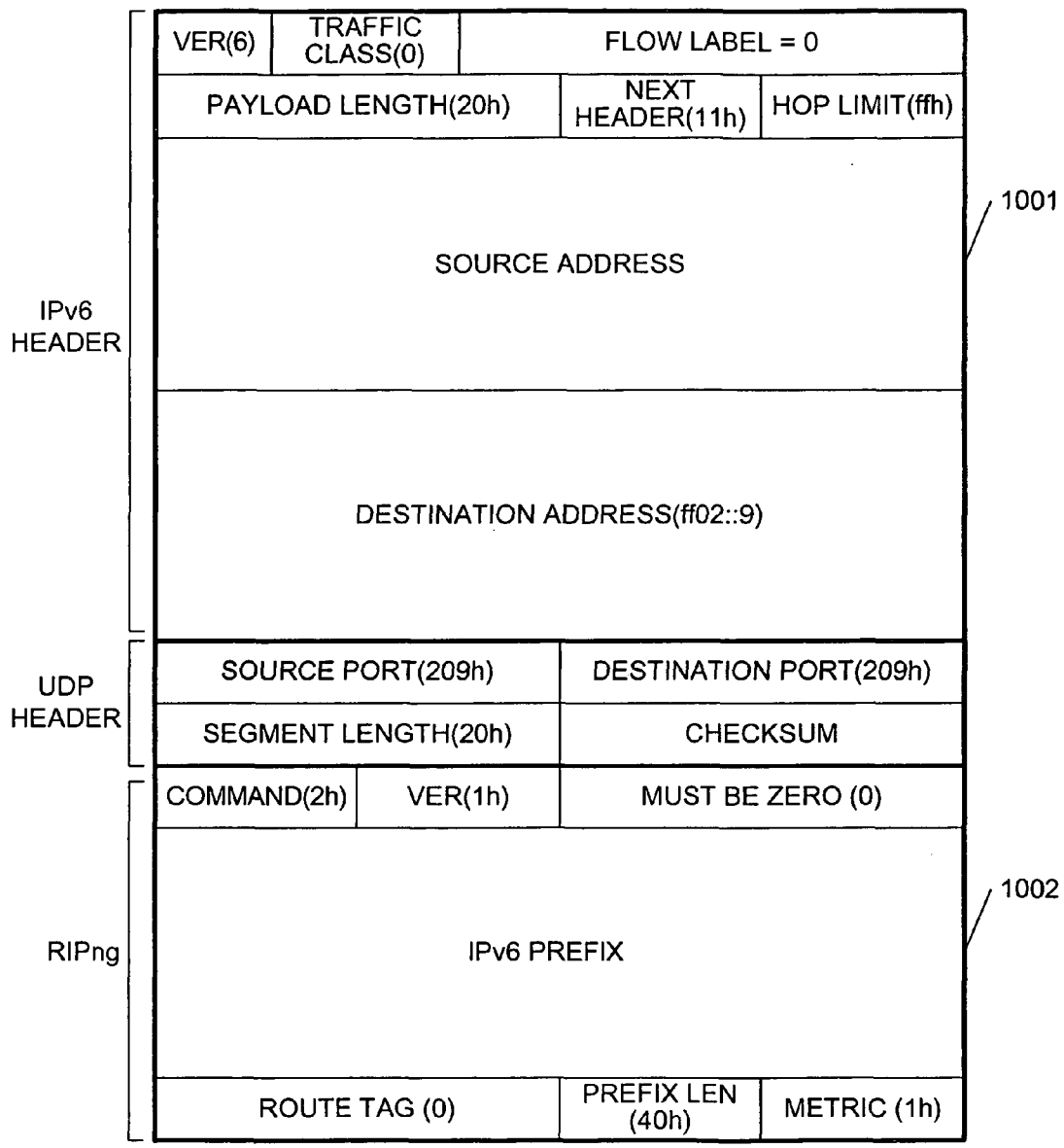
FIG. 10 is a figure showing an RIP data structure in embodiment 1 of the invention.

Meanwhile, HA 102 at this time checks whether or not there is a setting of M flag 901. When there is a setting, the information of the route to the network MR 103 manages is multicast to the home network by use of a routing protocol such as RIP or OSPF (step S805). FIG. 10 shows a data structure of routing information to be transmitted based on RIP. In FIG. 10, Source Address 1001 is set to be the link local address of HA 102 while IPv6 Prefix 1002 is set to be the M-prefix.

Figure 9B:
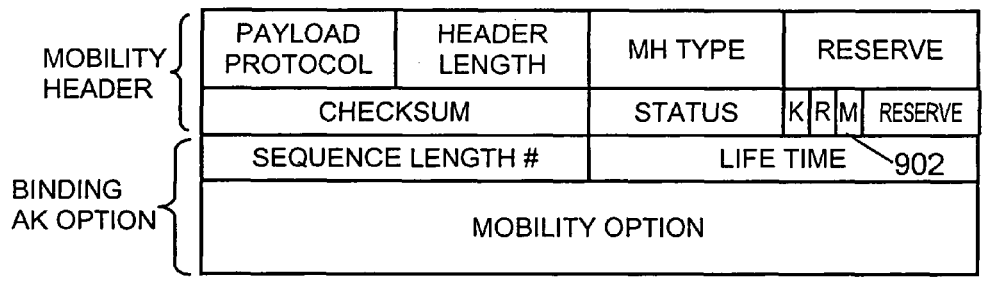
FIG. 9B is a figure showing a data structure of a binding acknowledge message in embodiment 1 of the invention.
Figure 9C:
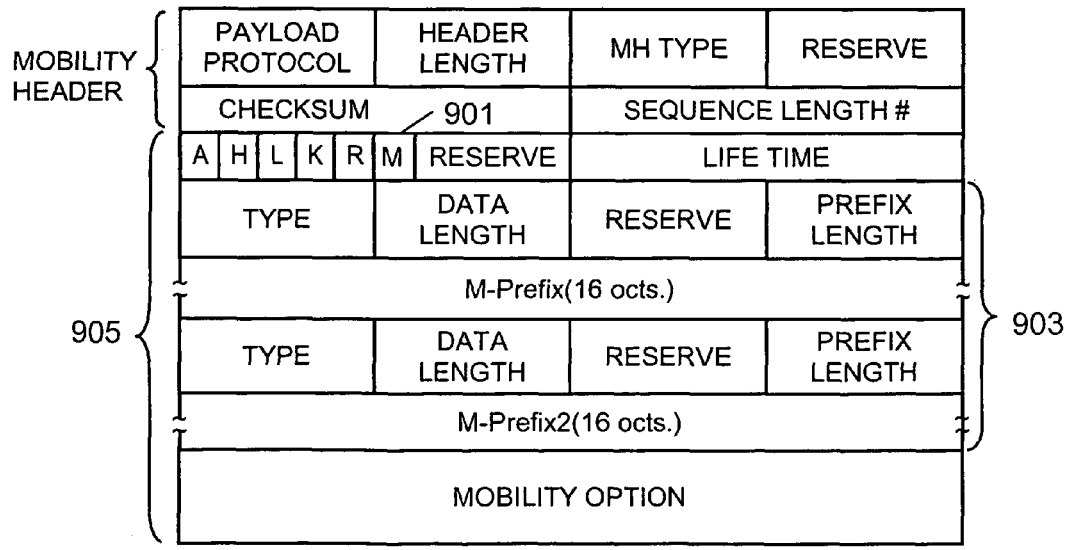
FIG. 9C is a figure showing a data structure of a binding update message including a plurality of mobile prefix options in embodiment 1 of the invention.

Thereafter, HA 102 sets on a binding acknowledge message shown in FIG. 9B the M flag 902 notifying that routing information has been sent to the home network, and transmits it to MR 103, thereby notifying that a binding update has been received (steps S806 to S808).

Meanwhile, GW 101 receives the routing information from HA 102 and updates its own routing table.

FIGS. 3A and 3B show a routing table at GW 101 in this embodiment. FIG. 3A shows MNET 105 before movement while FIG. 3B shows the same after movement.

In FIG. 3A, Destination 301 represents the network where the router has gone, Next hop 302 represents the address where the packet is next to be transferred, and IF 303 represents a network interface.

Before movement of MNET 105, M-Prefix was registered in Destination 301 in the routing table of GW 101, the link local address LL_MR of MR 103 was registered in Next hop 30, and if2 which is the GW 101 home link side of the network interface was registered in IF 303. However, after movement of MNET 105, routing information is received from HA 102, and Next hop 304 is changed into the link local address LL_HA of HA 102 as shown in FIG. 3B.

Due to this, the packet addressed to MNET 105 and arriving at GW 101 after movement of MNET 105 (step S809) is transferred to a home agent LL_HA which is the next hop shown in FIG. 3B (step S810). HA 102 receives the packet and transfers it to MR 103 after it has moved, by use of a tunnel route (steps S811 to S814).

As described above, when the information of the route to MR 103 is sent from MR 103 to HA 102 in a binding update message, it is sent to GW 101 in the home network without delay. This makes the loss of packets of from GW 101 to MR 103 much less than in the conventional method. Meanwhile, if MR 103 does not receive the binding acknowledge message, the binding update message is again sent to HA 102. Due to this, in the event of a movement to a network environment which is low in reliability, routing information can be given to the home network with assurance.

Explanation will now be made of the configuration and operation of MR 103 and HA 102 in this embodiment.

Figure 6:
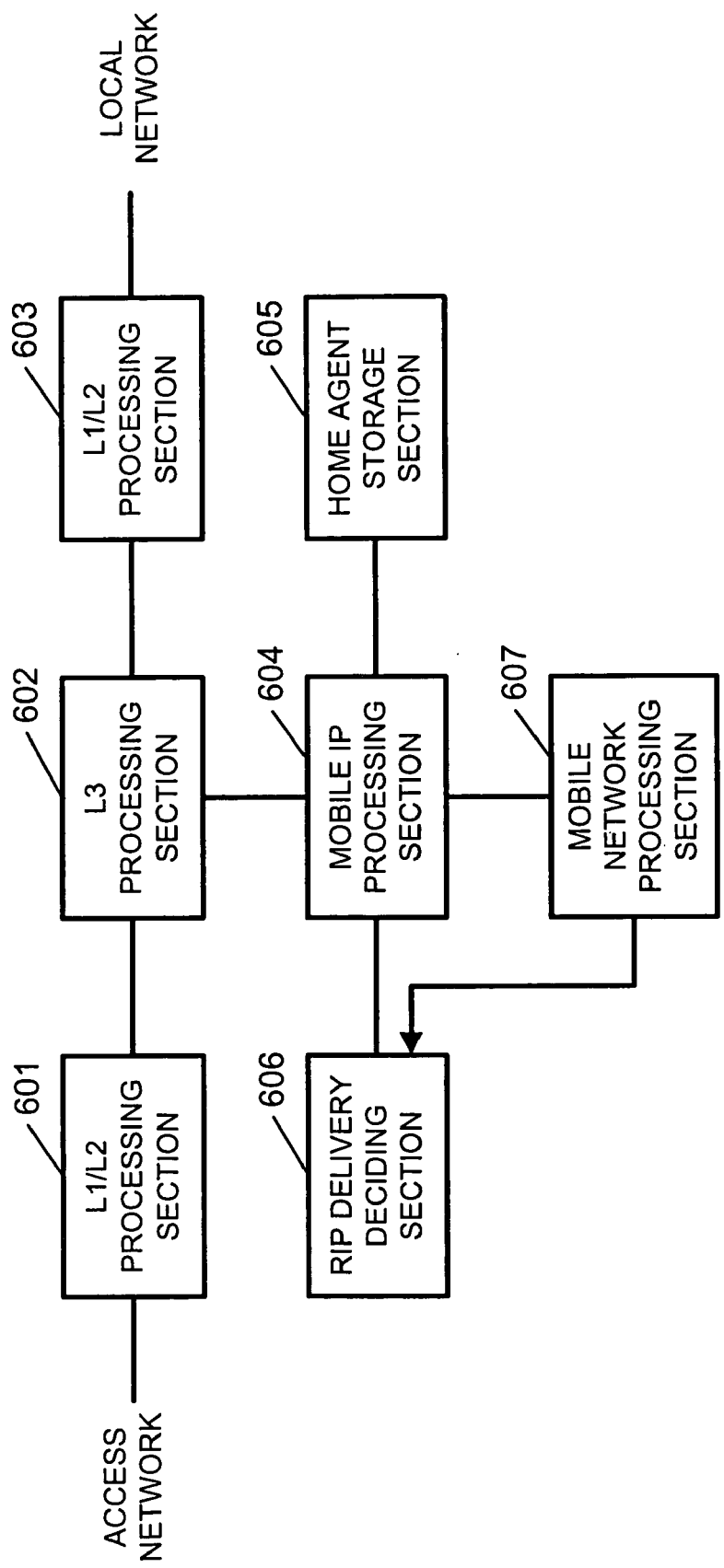
FIG. 6 is a block diagram showing a configuration of the mobile router in embodiment 1 of the invention.

FIG. 6 is a block diagram showing a configuration of MR 103.

In FIG. 6, L1/L2 processing section 601, 603 is for executing a communication processing of physical and data-link layers. L3 processing section 602 is for executing an IP protocol processing of a network layer. Mobile IP processing section 604 is for performing a mobile management of MR 103 depending upon a mobile IP procedure, thus having a function as a movement notifying section of the invention. Home-agent storage section 605 is for storing information about a home agent and home domain network, and a home address. Meanwhile, RIP delivery deciding section 606 is for deciding whether or not to transmit routing information according to a routing protocol, and corresponds to the route-information transmitting section of the invention. Mobile-network processing section 607 controls a request to the home agent for routing information, which corresponds to a route-information control request section of the invention.

Explanation is now made on the operation of MR 103 configured as above.

Figure 7:
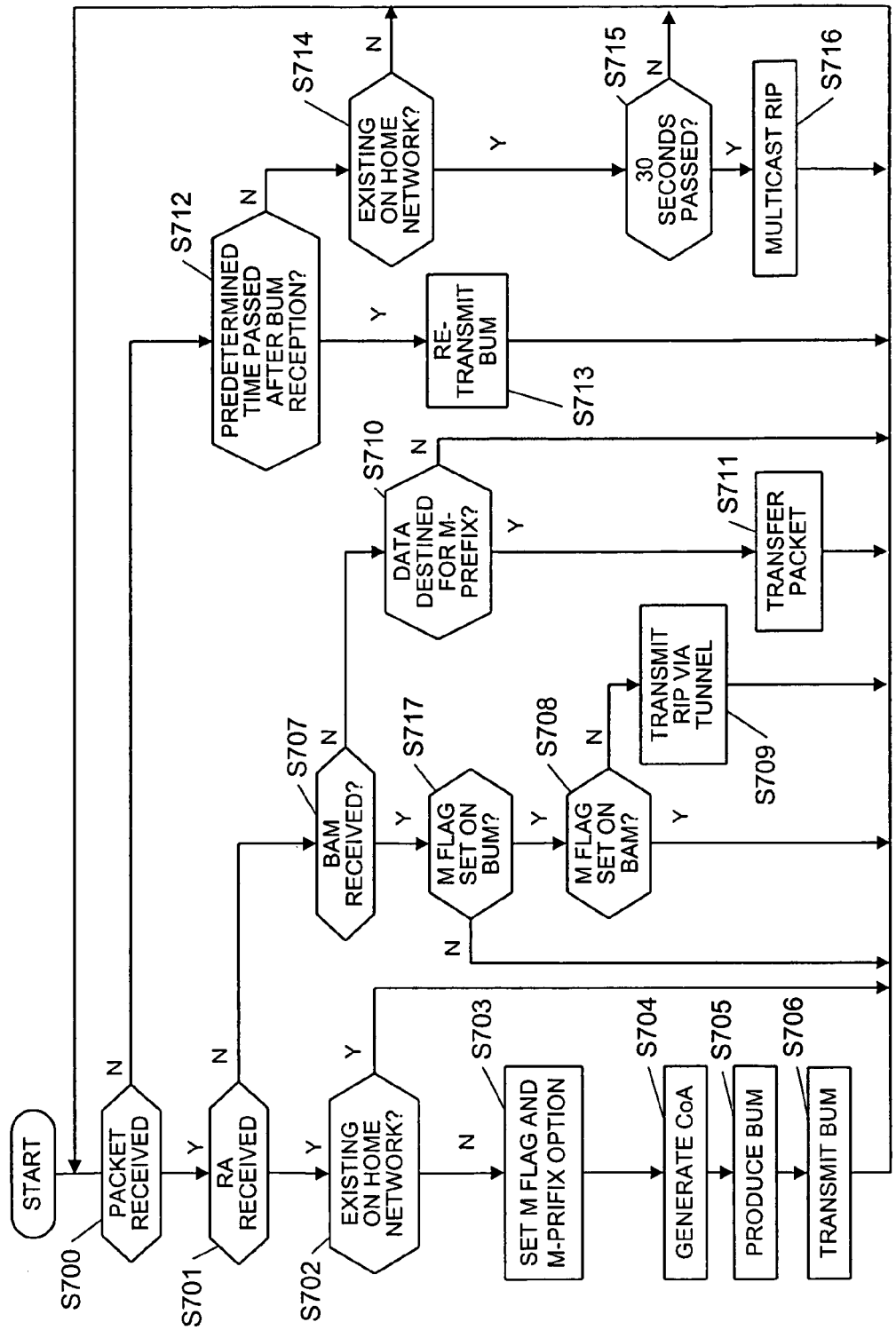
FIG. 7 is a flowchart showing a process of the mobile router in embodiment 1 of the invention.

FIG. 7 is a process procedure executed by MR 103.

First, the mobile IP processing section checks for a packet reception by way of L1/L2 processing section 601 and L3 processing section 602 (step S700). In the case there is a reception, check is made as to whether or not the received data is a router advertisement of an external network (described "RA" in FIG. 7) from AR 107 (step S701).

If it is a router advertisement, mobile IP processing section 604 acquires prefix information of the link to which the mobile network is currently connected from the network information thereof. From the information, check is made as to whether or not the network to which the mobile network is currently connected is its home network, referring to the home-agent storage section 605 (step S702). When it is connected to the home network, the process returns to the step S700.

If it is not connected to the home network, mobile IP processing section 604 notifies the mobile-network processing section 607. Mobile-network processing section 607 sets M flag 901 and mobile prefix option 903 in the binding update message shown in FIG. 9(a) (step S703), generates a care-of-address for use in the link (step S704), and prepares a binding update message (step S705).

Note that there is not always a need, at step S703, to make a setting of M flag 901 and mobile prefix option 903 in every binding update message transmission.

Then, mobile-network processing section 607 instructs mobile IP processing section 604 to transmit the binding update message. Mobile IP processing section 604 transmits the binding update message to AR 107, using the address of the home agent managing the home network stored in the home-agent storage section 605 (step S706). At this time, mobile IP processing section 604 starts counting of the timer for checking a reception of a binding acknowledge message. Thereafter, the process returns to the step S700.

In the case that the data received at the step S701 is not a routing advertisement, mobile IP processing section 604 decides whether or not it is a binding acknowledge message (step S707). In the case it is a binding acknowledge message, mobile-network processing section 607 checks whether or not there is a setting of M flag 901 on the binding update message forwarded earlier (step S717). In the case there is no setting, the process returns to the step S700.

In the case there is a setting of M flag 901 on the binding update message forwarded earlier, check is made as to whether or not there an M flag 902 is set on the received binding acknowledge message (step S708). When there is a setting, the process returns to the step S700.

In the case there is no setting of M flag 902, mobile-network processing section 607 decides that HA 102 is not a home agent as specified in the invention and notifies the RIP-delivery deciding section 606. RIP-delivery deciding section 606 instructs mobile IP processing section 604 to make a routing information transmission via a tunnel by means of RIP. Then, mobile IP processing section 604 transmits RIP to the tunnel (step S709). Then, the process returns to step S700.

In the case there is no binding acknowledge message at step S707, check is made as to whether or not the received packet address has an M-prefix (step S710). When the address does not have an M-prefix, the process returns to the step S700.

In the case the address has an M-prefix, the received packet is sent to fixed-terminal LFN 104 (step S711). Then, the process returns to the step S700.

In the case no packet is received at step S700, mobile IP processing section 604 checks whether or not a predetermined time has passed since transmission of the binding update message (step S712). If it has passed, the binding update message is again sent to HA 102 (step S713).

Meanwhile, if the predetermined time has not passed, RIP-transmission deciding section 606 decides based on the notification from mobile IP processing section 604 whether or not the mobile network is currently at its home network (step S714). If it is not at the home network, the process returns to the step S700. On the other hand, if it is at the home network, check is made as to whether or not a predetermined time, 30 seconds, has passed (step S715).

In the case 30 seconds has not passed, the process returns to the step S700. In the case 30 seconds has passed, RIP is multicast to the home network by way of L1/L2 processing section 51 and L3 processing section 52 (step S716). Then, the process returns to the step S700.

In this manner, in case the network to which the mobile network is currently connected is the home network, MR 103 multicasts the current address to HA 102, GW 101 and other routers, not shown, on the home network by means of RIP. In the case where the mobile network is not connected to its home network, it sets M flag 901 on the binding update message and requests the home agent to transmit RIP to the home network. This can reduce the frequency of conveying RIP through the external network, thus reducing the traffic over the network.

Meanwhile, MR 103, in the case it has not received a binding acknowledge message even when a predetermined time has passed after transmitting a binding update message to the home agent, resends the binding update message. This makes it possible to reliably convey an RIP transmission request to the home agent.

Furthermore, MR 103 can detect that the home agent has not accepted a request for an RIP transmission to the home network, by the fact that an M flag 902 is not set on the binding acknowledge message. This allows MR 103, in such a case, to notify the home agent of routing information via a tunnel by means of RIP.

Explanation is now made on the configuration and operation of HA 102.

Figure 4:
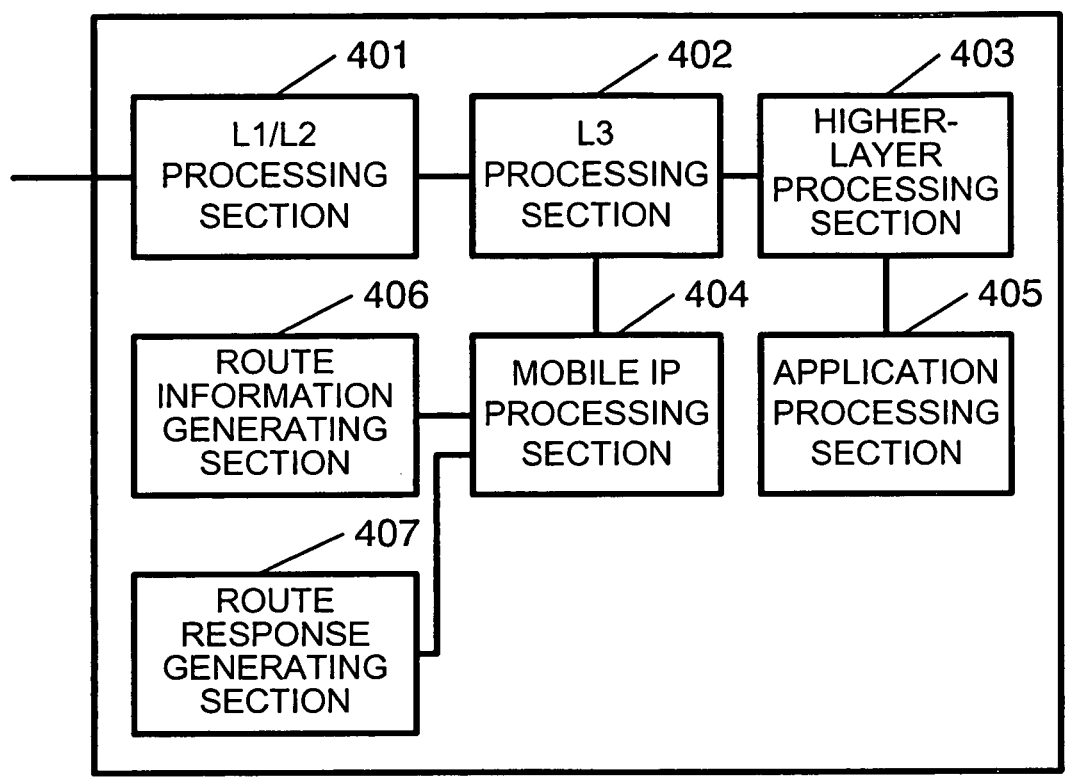
FIG. 4 is a block diagram showing a configuration of the home agent in embodiment 1 of the invention.

FIG. 4 is a block diagram showing a configuration of HA 102. In FIG. 4, L1/L2 processing section 401 is for executing physical layer processing and data-link layer processing. L3 processing section 402 is for executing a network layer processing, such as that of an IP protocol. Route-information generating section 406 is for generating routing information from a received binding update message. Route-response generating section 407 is for generating information indicating that routing information has been sent to the home network. Higher-layer processing section 403 is for executing a higher-layer processing, such as that of TCP and UDP. Mobile IP processing section 404 is for managing the movement of the mobile network, and comprises a route-information transmitting section, tunnel establishing section and response section of the invention. The route-information transmitting section is for transmitting each piece of information according to an instruction from route-information generating section 406 or route-response generating section 407. The tunnel establishing section is for forming a tunnel to a mobile router while the response section is for forwarding a binding acknowledge message.

Further, application processing section 405 is for controlling an application.

Explanation will now be made of the operation of HA 102 constructed as above.

Figure 5:
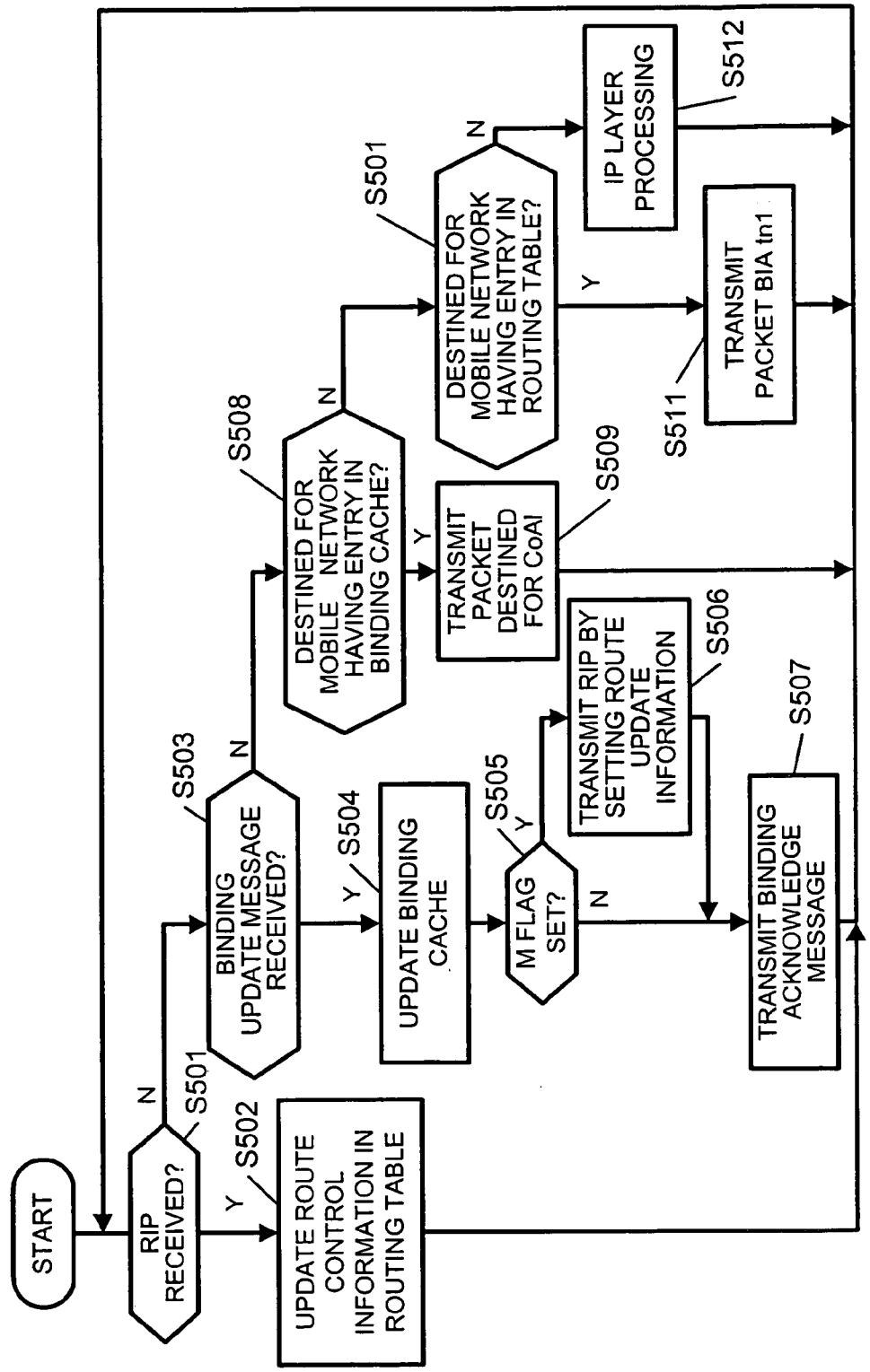
FIG. 5 is a flowchart showing a process of the home agent in embodiment 1 of the invention.

FIG. 5 is a process procedure HA 102 is to execute.

At first, mobile IP processing section 404 checks whether or not the packet received via L1/L2 processing section 401 and L3 processing section 402 is RIP (step S501). In the case it is RIP, the routing table is updated according to the routing information thereof (step S502).

In the case MR 103 belongs to the home network, HA 102 receives RIP from MR 103, and updates the routing table as was shown in FIG. 2B. Namely, M-Prefix is registered in Destination 204, the link local address LL_MR of MR103 is registered in Next hop 205, and if1 which is the HA 102 network interface is registered in IF 303.

On the other hand, when the received packet is not RIP, mobile IP processing section 404 checks for reception of binding update message (step S503). In the case it has been received, the binding cache is updated (step S504).

The following processing is carried out in updating the binding cache.

In the case there is an entry in a binding cache which HA 102 manages, the content of the binding cache is updated. In the case there is no entry, an entry is newly produced by use of the information contained in the binding update message. In the case MR 103 is connected with an external network, the binding update message is received and stored in a binding cache entry prepared by using, for example, a home address HoA1, a care-of-address CoA1, or prefix M-Prefix, of MR 103, as shown in FIG. 2A. Furthermore, mobile IP processing section 404 establishes a bi-directional IP tunnel tn1 between it and MR 103. In addition, the next hop 207 in the routing table is changed into care-of-address Coal as shown in FIG. 2C, and network interface IF 208 is updated into tunnel tn1.

Then, mobile IP processing section 404 checks whether or not there is a setting of M flag 901 on a received binding update message (step S505).

In the case there is no setting, the process moves to step S510. In the case there is a setting, RIP shown in FIG. 10 describing routing information of MNET 105 is transmitted (step S506). Due to this, the router and GW 101 which have received the routing information set the link local address LL-HA of HA 102, as the next hop 304 to MR 103, as shown in FIG. 3B.

Then, mobile IP processing section 404 transmits a binding acknowledge message including a notice of the success/failure of binding cache update, addressed to MR 103, through L3 processing section 402 and L1/2 processing section 401 (step S507). In this case, at step S506 when transmitting RIP in accordance with M flag 901 of the binding update message, M flag 902 of the binding acknowledge message to be sent is set in order to convey that routing information has been transmitted.

Meanwhile, in the case where the packet received during step S503 is not a binding update message, mobile IP processing section 404 decides whether or not the received packet is addressed to a mobile network having an entry in the binding cache (step S508). In the case it has an entry, the received packet is encapsulated by an IP header having a registered care-of-address CoA1 for its address and is transmitted by way of L3 processing section 402 and L1/2 processing section 401 (step S509).

Meanwhile, in the absence of an entry, mobile IP processing section 404 decides whether or not the packet is addressed to a mobile network having an entry in the routing table (step S510).

In the case there is an entry in the routing table, mobile IP processing section 404 transmits the received packet in compliance with the routing table (step S511). If MNET 105 has moved to an external network, the packet whose address has an M-Prefix is directed toward next hop CoA1 and sent to tunnel tn1 according to the routing table shown in FIG. 2C.

On the other hand, in the case there is no entry in the routing table, the usual IP layer process is carried out at L3 processing section 402 without executing a process at the mobile IP processing section 404 (step S512). Thereafter, the process returns to the step S501.

As described above, in HA 102 of the invention, by checking M flag 901 in the binding update message received from MR 103, notification is made to GW 101 and routers, not shown, in the home network by means of RIP, that the address with an M-Prefix is the link local address LL_HA to HA 102. Accordingly, the packet addressed with an M-Prefix can be received from GW 101 and the routers, not shown, on the home network. Due to this, HA 102 does not need to capture the packet flowing over the home network, thus making it possible to suppress the overhead resulting therefrom.

Figure 11:
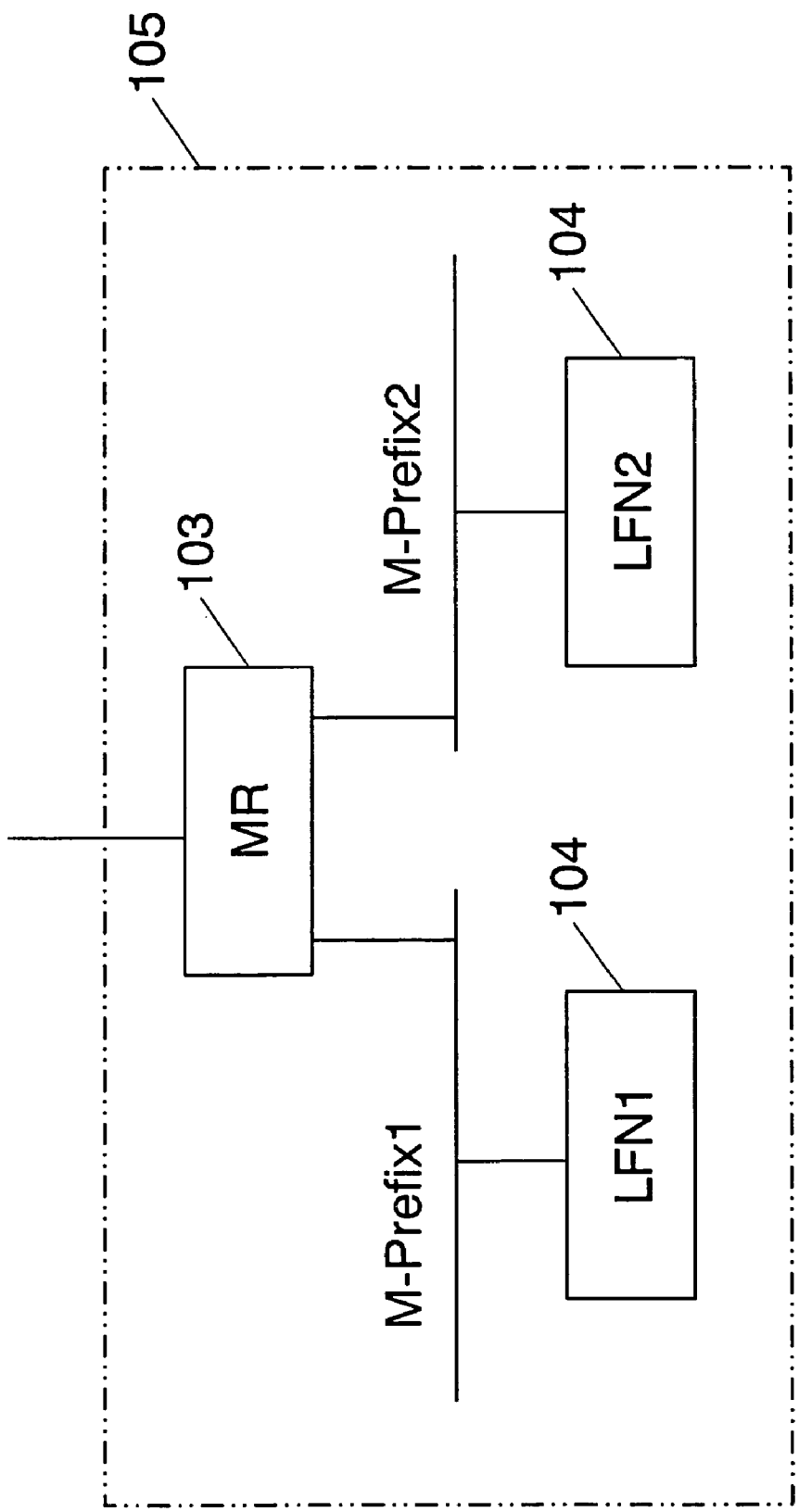
FIG. 11 is a figure showing an MNET (mobile network) structure including a plurality of network prefixes in embodiment 1 of the invention.

Meanwhile, in this embodiment, MNET (mobile network) 105 has one network prefix, M-Prefix, under control of MR 103, as shown in FIG. 1. However, a plurality of network prefixes, e.g. M-Prefix1, M-Prefix2, can be arranged under control of MR 103, as shown by MNET 105 in FIG. 11.

In this case, MR 103 which acquired a care-of-address from the network where it has gone, transmits a binding update message to HA 102 according to a flowchart shown in FIG. 7. However, when setting a network prefix "M-Prefix" at step S717, all the network prefixes "M-Prefixes" under management can be transmitted by adding the required number of mobile prefix options 903 from among the binding update options 905, to serve as the mobility options.

Furthermore, HA 102, having received a binding update message including a plurality of mobile prefix options, is enabled to produce a RIP message with a number of IPv6 Prefixes 1002 (FIG. 10) equal to the required number of M-Prefixes, and transmit the message to the home link whereby it can receive a plurality of packets whose addresses have M-Prefixes and transfer them to MR 103.

Incidentally, although this embodiment uses the M flag, the invention is not limited to this. Where it is confirmed that the home agent is a home agent according to the invention, the mobile router may transmit a binding update message to the home agent when it moves in the conventional way without the use of an M flag. In this case, the home agent checks the binding cache and recognizes the absence of the mobile network from the home network, at which time notification is made to the gateway and routers on the home network by means of RIP.

Meanwhile, GW 101, in the embodiment of the invention also is not different from the usual GW, i.e. it updates the routing table based on the routing information given by RIP and transfers a received packet according to the routing table.

Also, although this embodiment uses RIP for the notification of routing information, the same effect can be obtained with a routing protocol such as OSPF.

Embodiment 2

Figure 12:
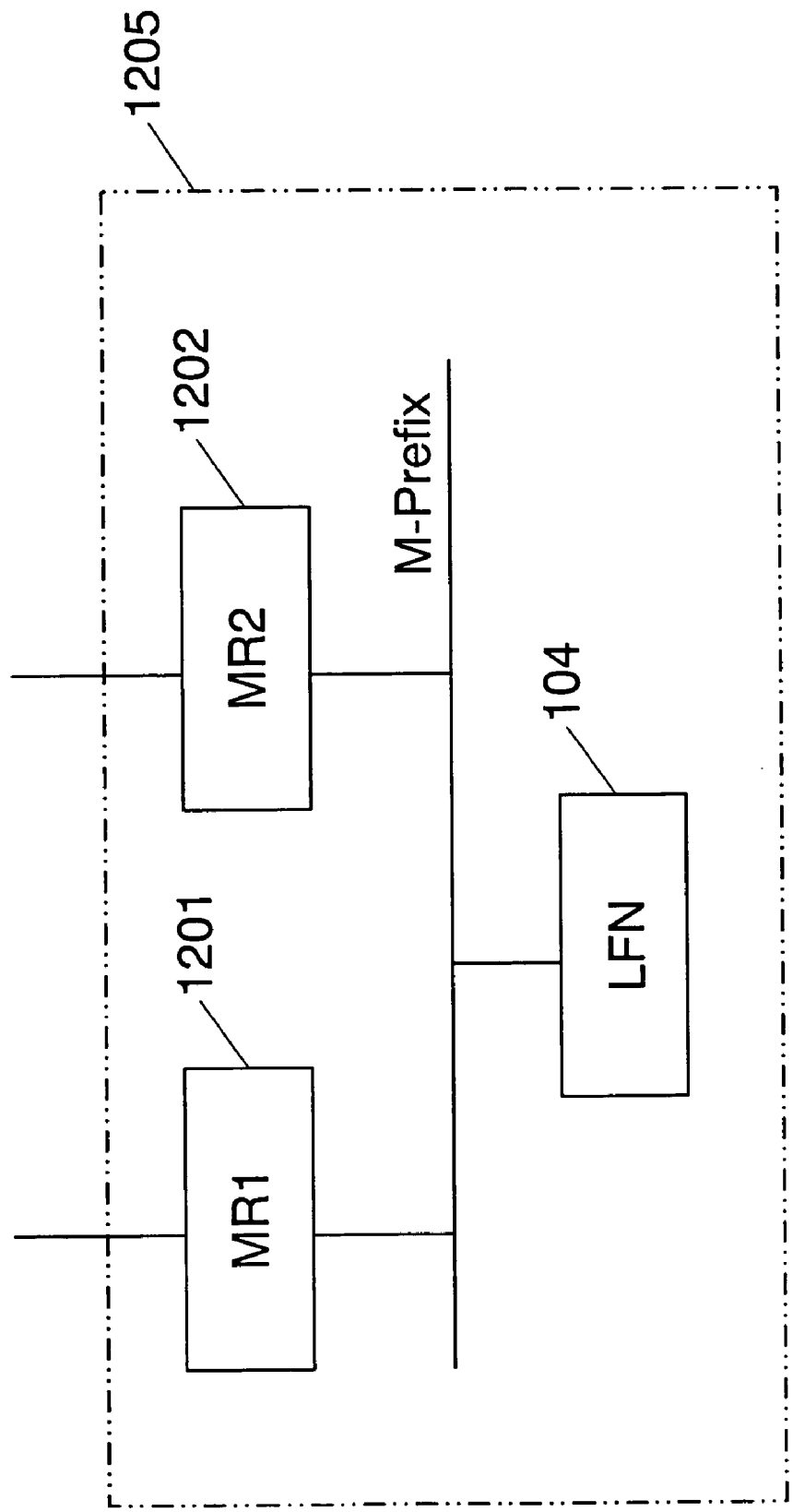
FIG. 12 is a figure showing an MNET (mobile network) structure including a plurality of mobile routers in embodiment 2 of the invention.

FIG. 12 is a block diagram showing an MNET configuration according to this embodiment. As shown in FIG. 12, a plurality of MR1 (1201) and MR2 (1202) are arranged given one network prefix "M-Prefix", thereby implementing the management of MNET 1205.

Explanation is now made on the operation of data transfer during the movement of MNET 1205, taking the in place of MNET 105 in this embodiment, in the mobile communication system shown in FIG. 1.

It is assumed, in this case, that MR1 (1201) travels to and makes connection with a network and acquires a care-of-address CoA1 from AR 107. Then, HA 102 is notified of the CoA1 acquired and network prefix "M-Prefix" by means of a binding update message.

HA 102, having received the binding update message, processes the message according to the flowchart shown in FIG. 5 similarly to embodiment 1, thereby setting up a bi-directional IP tunnel tn1. Furthermore, it sets up a binding cache (FIG. 2A) and a routing table (FIG. 2C).

Then, in the case MR2 (1202) goes and makes connection to a network and acquires a care-of-address CoA2, it sends to HA 102 the CoA2 acquired and network prefix "M-Prefix" by means of a binding update message.

HA 102, having received the binding update message, processes the message according to the flowchart shown in FIG. 5 similarly to embodiment 1, thereby setting up a bi-directional IP tunnel tn2. Furthermore, it sets up a binding cache (FIG. 13A) and a routing table (FIG. 13B).

Because two entries are to be prepared with the same address M-Prefix in the routing table (FIG. 13B), a default route 209 is newly introduced. Check is made as to whether there is an M flag 901 is set on the binding update message received from MR2 (1202). In the absence of a flag, in the entry whose Next hop in the routing table has previously been set to be CoA1, the default route is set to be 1 as shown at 210 in FIG. 13B. In the case there is a setting of M flag, in the entry whose Next hop in the routing table has previously been set to be CoA2, the default route is set to be 1 as shown at 211 in FIG. 13C.

Furthermore, HA 102 receives a packet being transferred to an address with an M-Prefix. When transferring it according to the routing table, in the case there are a plurality of entries having addresses with M-Prefix within the routing table, packet transfer is made by referring to the default route column within the entry and selecting the Next hop and IF which is set at 1. Due to this, even where there is a plurality of routing table entries concerning MNET 1205, which entry is to be used can be decided, thus enabling packet transfer.

Figure 14:
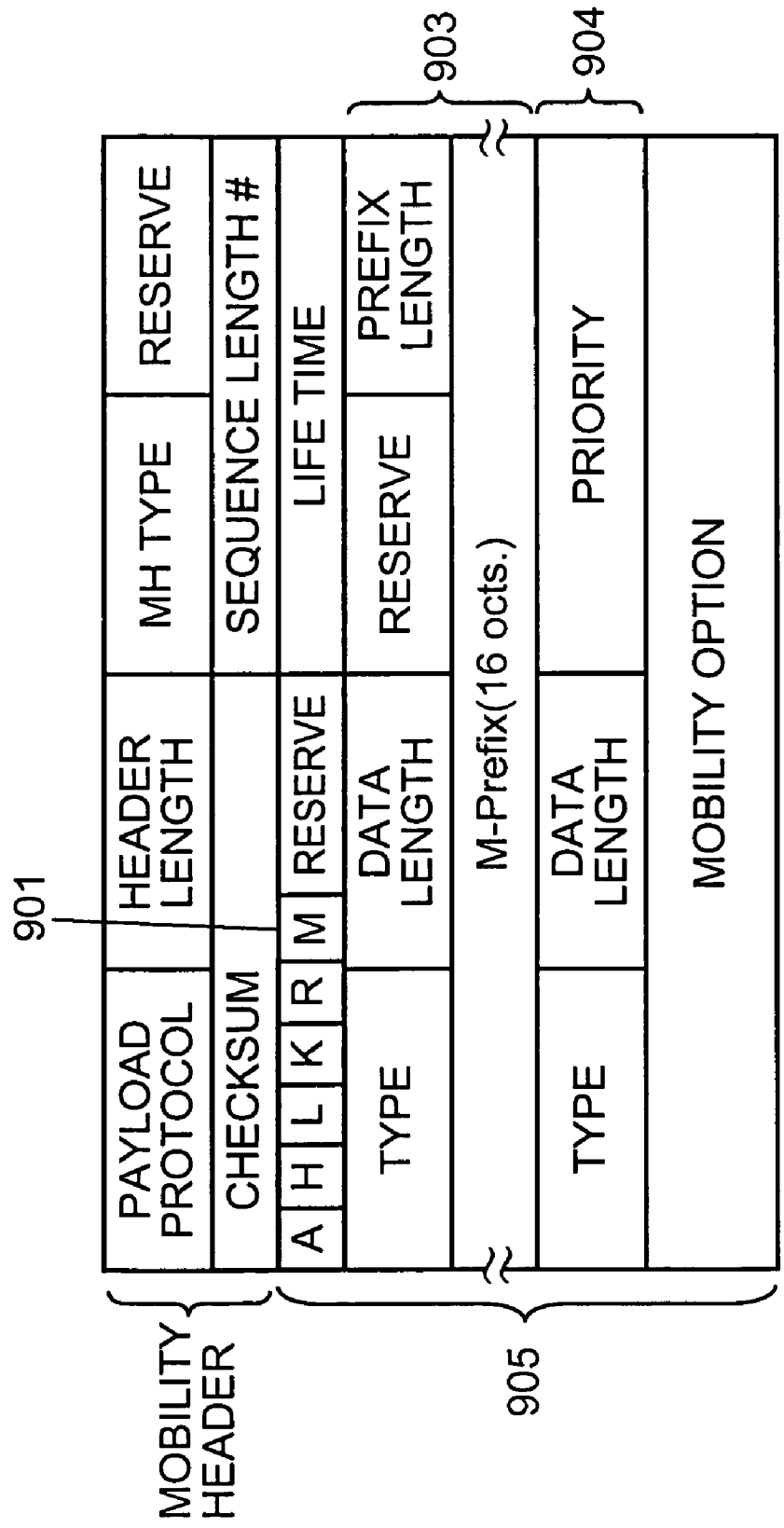
FIG. 14 is a figure showing a data structure of a binding update message in embodiment 2 of the invention.

Furthermore, even if an M flag is not used, preference option 904 can be provided in the binding update option 905 as shown in FIG. 14, in the binding update message to be sent by MR1 (1201) or MR2 (1202) so that HA 102 can be notified of a priority order of the mobile routers by means of preference option 904.

HA 102, having received the binding update message having preference option 904, provides its routing table with a preference column 212 as shown in FIG. 13D, to store the priority order of the mobile routers.

Then, HA 102 receives a packet being transferred to an address with an M-Prefix. When transferring it based on the routing table, where there are a plurality of entries having addresses with M-Prefix within the routing table, packet transfer is made by referring to the preference column within the entry and selecting the Next hop and IF highest in priority. Due to this, where there are a plurality of routing table entries concerning MNET 1205, it can be decided which entry is to be used, thus enabling packet transfer.

As described above, according to the present embodiment, even in the case of a movement of MNET 1205 having plural MR1 (1201) and MR2 (1202) for one network prefix "M-Prefix", the HA can immediately change the routing table of the mobile network and transfer the packet to a suitable entry. This, accordingly, can prevent the loss of a message to a node belonging to the mobile network.

INDUSTRIAL APPLICABILITY

The present invention is useful for communication with a mobile network traveling as one unit between networks, and is suited for allowing transmission to be made without changing the address of the node belonging to the mobile network.

The invention claimed is:

1. A mobile communication method comprising:
   transmitting, by a mobile router, a binding update message in which the mobile router, managing a mobile local network moving between networks as one unit, notifies a home agent of a care-of-address of the mobile router which was acquired at a network to which the mobile local network has gone;
   determining, by the mobile router based on information received from the home agent in an acknowledgment message, whether the home agent, at a time the home agent receives the binding update message, has without delay sent route information concerning a route to the mobile local network which the mobile router manages to a gateway of a home network;
   responsive to the home agent having sent the route information to the gateway of the home network, effecting route control depending upon the route information; and
   responsive to the mobile router determining that the home agent has not sent the route information to the gateway of the home network, sending, by the mobile router to the home agent, a further message using a routing protocol to indicate the route information to the home agent, and notifying the route information to the home network,
   wherein:
   the determining of whether the home agent has without delay sent the route information to the gateway of the home network includes determining whether the received acknowledgement message includes an acknowledgment flag that indicates the home agent has notified the gateway concerning the routing information, and responsive to the received acknowledgement flag indicating that the home agent has not notified the gateway concerning the routing information, transmitting, by the mobile router to the home agent, the routing information, as the further message, via a tunnel to the mobile local network.

2. A mobile communication method according to claim 1, further comprising:

notifying, by the home agent, the mobile router that the home agent has sent the routing information to the gateway; and if the routing information from the home agent is not received by the gateway, the mobile router gives the home agent information concerning the route to the mobile local network by means of the routing protocol.

3. A mobile communication method according to claim 2, wherein to the route information is added an instruction for transfer of data addressed to the mobile local network to the home agent.

4. A mobile communication method according to claim 1, wherein to the route information is added an instruction to transfer data addressed to the mobile local network to the home agent.

5. A mobile communication method according to claim 1, wherein the route information includes a prefix of the mobile local network which the mobile router manages.

6. The method of claim 1, wherein responsive to sending the route information to the gateway, notifying, in an acknowledgement message by the home agent, the mobile router that the home agent has sent the route information; and if the acknowledgement message is not received by the mobile router within a predetermined time after transmitting the binding update message, the mobile router sends a multicast message to at least the home agent and the gateway concerning the route to the mobile local network.

7. The method of claim 6, further comprising:

prior to sending the multicast message, determining whether the local mobile network is connected to the home network; and selecting between a first mode in which the multicast message is sent in accordance with the determination that the local mobile network is connected to the home network and a second mode in which the mobile router retransmits the binding update message.

8. A device comprising a processor and a memory, the memory storing instructions to be executed by the processor for implementing a home agent device comprising:

a tunnel establishing section for receiving a care-of-address from a mobile router managing a mobile local network moving as one unit between networks, the care-of-address acquired from a network where the mobile local network has gone, and forming a tunnel for transmitting data to the mobile local network;

a route information generating section, responsive to receiving a transmitted binding update message from the mobile router, generating route information using a routing protocol concerning a route to the mobile local network that the mobile router manages;

a route information transmitting section for, responsive to receiving a retransmission binding update message via the tunnel, the retransmitted binding update message including the route information from the mobile router and indicating that the home agent did not receive the transmitted binding update message or that the mobile router did not receive a binding acknowledgement message from the home agent, sending the route information to a gateway of a home network based on reception of the retransmitted binding update message;

a route-response generating section for generating a notice message indicating that the route information transmitting section has or has not sent the route information; and a response section for transmitting the notice message to the mobile router, wherein the route-response generating section, responsive to receiving the retransmitted binding update message indicating that the mobile router determined that home agent did not send the route information, generates the notice message including an acknowledgment flag indicating that the home agent has notified the gateway concerning the routing information.

9. A home agent according to claim 8, wherein to the route information is added an instruction to transfer data addressed to the mobile local network to the home agent.

10. A home agent according to claim 9, wherein the route information generating section generates the route information concerning the route to the mobile local network and instructs the route information transmitter to transmit same, in response to a request from the mobile router.

11. A home agent according to claim 8, wherein the route information generating section generates the route information concerning the route to the mobile local network and instructs the route information transmitting section to transmit same, in response to a request from the mobile router.

12. A home agent according to claim 8, wherein the route information includes a prefix of the mobile local network which the mobile router manages.

13. A device comprising a processor and a memory, the memory storing instructions to be executed by the processor for implementing a mobile router comprising:

a movement detecting section for deciding whether a network to which a mobile local network is connected has changed or not;

a movement notifying section for transmitting a binding update message notifying a home agent of a care-of-address acquired from a network where the mobile local network has gone when the movement detecting section detects that a network to which the mobile local network is connected has changed;

a route information control request section for requesting the home agent, at a time the home agent receives the binding update message, notify without delay a gateway of a home network of route information concerning a route to the mobile local network which the mobile router manages;

a receiving section for receiving an acknowledgement message indicating that the home agent has sent the route information to the gateway; and a determining section for determining based on results of the acknowledgement message sent from the home agent whether the home agent has sent the route information, wherein:

the route information control request section sends a further message responsive to the determining section determining that the route information has not been sent by the home agent to the gateway, the further message includes the route information sent using a routing protocol to notify the route information to the home network;

the determining section determines whether the home agent has without delay sent the route information to the gateway of the home network by determining whether the received acknowledgement message includes an acknowledgment flag that indicates the home agent has notified the gateway concerning the routing information, and responsive to the received acknowledgement flag indicating that the home agent has not notified the gateway concerning the routing information, the mobile router transmits the routing information, as the further message, via a tunnel to the mobile local network.

14. A mobile router according to claim 13, further comprising a route information transmitting section for transmitting the route information to the home network at a predetermined time only during connection to the home network.

15. A mobile router according to claim 13, wherein the route information includes a prefix of the mobile local network which the mobile router manages.

* * * * *